US009664330B2

(12) United States Patent
Deno et al.

(10) Patent No.: US 9,664,330 B2
(45) Date of Patent: May 30, 2017

(54) METHOD FOR PRODUCING VACUUM INSULATION MATERIAL

(75) Inventors: Hiroshi Deno, Yokkaichi (JP); Takehiro Hamano, Yokkaichi (JP); Xing Kai Chen, Yokkaichi (JP)

(73) Assignee: FUJI ELECTRIC CO., LTD., Kawasaki-Shi (JP)

(*) Notice: Subject to any disclaimer, the term of this patent is extended or adjusted under 35 U.S.C. 154(b) by 566 days.

(21) Appl. No.: 14/125,351

(22) PCT Filed: Aug. 23, 2012

(86) PCT No.: PCT/JP2012/071283
§ 371 (c)(1),
(2), (4) Date: Jan. 15, 2014

(87) PCT Pub. No.: WO2013/031624
PCT Pub. Date: Mar. 7, 2013

(65) Prior Publication Data
US 2014/0127430 A1    May 8, 2014

(30) Foreign Application Priority Data

Aug. 30, 2011   (JP) .................................. 2011-186894

(51) Int. Cl.
*C04B 35/626*    (2006.01)
*F16L 59/065*    (2006.01)
(Continued)

(52) U.S. Cl.
CPC .......... *F16L 59/065* (2013.01); *B28B 11/241* (2013.01); *C04B 33/13* (2013.01);
(Continued)

(58) Field of Classification Search
CPC ...... C04B 2235/3201; C04B 2235/442; C04B 2235/239
See application file for complete search history.

(56) References Cited

U.S. PATENT DOCUMENTS 4,631,158 A    12/1986    Rieck et al.
5,338,349 A    8/1994    Farrar
(Continued)

FOREIGN PATENT DOCUMENTS

JP    11-182781 A    7/1999
JP    3513143 B1    3/2004
(Continued)

OTHER PUBLICATIONS

Jones, John T. and Michael F. Berard. Ceramics: Industrial Processing and Testing. Ames, IA, Iowa State University Press, 1993. p. 110.*

(Continued)

*Primary Examiner* — Erin Snelting
(74) *Attorney, Agent, or Firm* — Rabin & Berdo, P.C.

(57) ABSTRACT

A method for producing a vacuum insulation material includes producing a core by molding a core starting material composition, containing a talc-based clay mineral, a potassium compound and an organic solvent, into a predetermined shape to yield a core molded body, and firing the core molded body at a temperature that is lower than the melting point of the talc-based clay mineral. The core is vacuum-packaged with a gas barrier packaging material, to thereby produce a vacuum insulation material.

15 Claims, 3 Drawing Sheets

(51) Int. Cl.
*C04B 38/06* (2006.01)
*E04B 1/80* (2006.01)
*B28B 11/24* (2006.01)
*C04B 33/13* (2006.01)
*C04B 33/30* (2006.01)
*C04B 111/28* (2006.01)

(52) U.S. Cl.
CPC ........ *C04B 33/30* (2013.01); *C04B 35/62625* (2013.01); *C04B 38/06* (2013.01); *E04B 1/803* (2013.01); *C04B 2111/28* (2013.01); *C04B 2235/3201* (2013.01); *C04B 2235/349* (2013.01); *C04B 2235/3445* (2013.01); *C04B 2235/3463* (2013.01); *C04B 2235/442* (2013.01); *C04B 2235/5436* (2013.01); *C04B 2235/667* (2013.01); *C04B 2235/77* (2013.01); *C04B 2235/9607* (2013.01); *F25D 2201/14* (2013.01); *Y02B 80/12* (2013.01); *Y10T 428/1334* (2015.01)

(56) References Cited

U.S. PATENT DOCUMENTS

| | | | |
|---|---|---|---|
| 2001/0008671 A1* | 7/2001 | Kuroda | F16L 59/065 428/69 |
| 2005/0175809 A1* | 8/2005 | Hirai | F16L 59/065 428/69 |
| 2006/0234006 A1 | 10/2006 | Tenra | |
| 2013/0202839 A1 | 8/2013 | Deno | |

FOREIGN PATENT DOCUMENTS

| | | |
|---|---|---|
| JP | 3580315 B1 | 10/2004 |
| JP | 2005-307995 A | 11/2005 |
| JP | 2008-230866 A | 10/2008 |
| WO | WO 2012-035671 A1 | 3/2012 |

OTHER PUBLICATIONS

Extended European Search Report dated Feb. 27, 2015.

* cited by examiner

METHOD FOR PRODUCING VACUUM INSULATION MATERIAL

TECHNICAL FIELD

The present invention relates to a method for producing a vacuum insulation material.

BACKGROUND ART

Vacuum insulation materials are thermal insulation materials in which a core is vacuum-packaged with a gas-barrier packaging material and the interior is maintained in a vacuum state, to elicit thereby the effect of lowering the thermal conductivity of a gas. Vacuum insulation materials have excellent thermal insulation properties, and hence are used in appliances such as freezers, refrigerators, cooler/warmer boxes and vending machines, in the production of residential wall materials and in other various fields.

As the core of the vacuum insulation material there are used inorganic fiber cores of glass fiber or the like, resin-foam cores of urethane foam or the like, and fine-powder cores of micro-powdered silica or the like. Vacuum insulation materials that utilize inorganic fiber cores, in particular, exhibit excellent thermal insulation properties, and are therefore widely used in applications where yet higher thermal insulation properties are required. Inorganic fiber cores are improved in various ways in order to further enhance the thermal insulation properties of the vacuum insulation material.

When the orientation state of the inorganic fibers that make up the core is irregular, for instance, the thermal conductivity of the core increases, whereupon the core inorganic fibers themselves constitute heat transfer paths. In Patent Document 1 (identified further on), accordingly, thermal conduction by the inorganic fibers is curtailed, and the thermal conductivity of the core is further reduced, by stacking and arranging the inorganic fibers substantially perpendicularly to the heat transfer direction.

When a binder is used to mold the inorganic fiber core, heat conduction in the heat insulation direction increases, on account of thermal cross-linking of the solidified binder. Such being the case, Patent Document 2 (identified further on) discloses the feature of producing a core that is molded into a predetermined shape without using any binder.

Patent Document 1: Japanese Patent Publication No. 3513143

Patent Document 2: Japanese Patent Publication No. 3580315 B

In vacuum insulation materials that utilize inorganic fiber cores, however, thermal conductivity rose significantly accompanying rises in atmosphere temperature, and thermal insulation properties failed to be sufficiently satisfied in high-temperature environments. The above may be attributed to the fact that, since mobility of gas molecules in inorganic fiber cores is comparatively good, the motion of the gas molecules becomes more vigorous as the atmosphere temperature rises, and the thermal conductivity increases accordingly.

When the vacuum insulation material was exposed to a high-temperature environment, moreover, outgas was released by the packaging material and so forth, the degree of vacuum dropped gradually, and thermal insulation properties degraded readily over time.

SUMMARY

Therefore, it is an object of the present invention to provide a method for producing a vacuum insulation material that has excellent thermal insulation properties even in high-temperature environments, and that has excellent thermal insulation properties over long periods of time.

To attain the above goal, the method for producing a vacuum insulation material comprises the steps of producing a core by molding a core starting material composition, containing a talc-based clay mineral, a potassium compound and an organic solvent, into a predetermined shape to yield a core molded body, and firing the core molded body at a temperature that is lower than a melting point of the talc-based clay mineral; and vacuum-packaging the core with a gas-barrier packaging material.

In the method for producing a vacuum insulation material of the present invention, preferably, the core molded body is fired by infrared heating.

In the method for producing a vacuum insulation material of the present invention, preferably, the organic solvent contains at least a polar organic solvent, and the core molded body is fired by microwave heating, or by microwave heating and infrared heating concomitantly.

In the method for producing a vacuum insulation material of the present invention, preferably, a talc-based clay mineral having an average particle size ranging from 1 to 25 μm is used as the talc-based clay mineral.

In the method for producing a vacuum insulation material of the present invention, preferably, one or more types of potassium compounds selected from potassium carbonate and potassium hydrogen carbonate is used as the potassium compound.

In the method for producing a vacuum insulation material of the present invention, preferably, the core starting material composition contains, in a solids fraction, 10 to 50 mass % of the talc-based clay mineral and 50 to 90 mass % of the potassium compound, and contains 5 to 20 parts by mass of the organic solvent with respect to a total of 100 parts by mass of the talc-based clay mineral and the potassium compound.

In the method for producing a vacuum insulation material of the present invention, preferably, the core starting material composition further contains a combustion aid, and the content of the combustion aid ranges from 0.1 to 20 parts by mass with respect to a total of 100 parts by mass of the talc-based clay mineral and the potassium compound. Preferably, the combustion aid is one or more types selected from fatty acids, fatty acid esters and paraffin.

In the method for producing a vacuum insulation material of the present invention, preferably, the core starting material composition is roll-formed to yield the core molded body, followed by the firing.

In the method for producing a vacuum insulation material of the present invention, preferably, the core molded body is fired through heating at a temperature ranging from 700° C. to less than 1000° C.

In the method for producing a vacuum insulation material of the present invention, preferably, a bulk density of the core ranges from 0.15 to 1.5 $g/cm^3$ in a state before vacuum packaging, and from 0.16 to 1.7 $g/cm^3$ in a state after vacuum packaging.

In the method for producing a vacuum insulation material of the present invention, preferably, the porosity of the core ranges from 55 to 95% in a state before vacuum packaging, and from 49 to 86% in a state after vacuum packaging.

In the method for producing a vacuum insulation material of the present invention, a core molded body, which is obtained by molding a core starting material composition containing a talc-based clay mineral, a potassium compound and an organic solvent into a predetermined shape, is fired at a temperature that is lower than the melting point of the talc-based clay mineral; as a result, there is obtained a core in which, by virtue of thermal decomposition of the potassium compound between layers of the talc-based clay mineral, a blowing gas such as carbon dioxide is generated and the talc-based clay mineral undergoes interlayer expansion and cleavage, and in which at least part of the talc-based clay mineral is partially bonded. The organic solvent becomes intercalated between the layers of the talc-based clay mineral, and is dispersed substantially homogeneously in the core molded body. Therefore, the calorific value of the core molded body increases by virtue of the organic solvent, and the core molded body can be sufficiently heated, up to the interior thereof. As a result, a core is obtained wherein interlayer expansion and cleavage in the talc-based clay mineral take place not only on the surface of the core molded body but also in the interior of the core molded body, and the cleavage products of the talc-based clay mineral (hereafter, talc cleavage products) become intricately stacked in the form of a card-house structure with expanded interlayer spacing in the talc-based clay mineral.

In a core thus obtained, the motion paths of gas molecules are complex, mobility of the gas molecules is low, and the temperature dependence of thermal conductivity is likewise low. Therefore, a vacuum insulation material having excellent thermal insulation properties, even in high-temperature environments, and having excellent thermal insulation properties over long periods of time, can be produced by vacuum-packaging the abovementioned core with a gas-barrier packaging material.

By using a talc-based clay mineral having an average particle size ranging from 1 to 25 μm, it becomes possible to produce a vacuum insulation material having yet better thermal insulation properties and in which a card-house structure having a pore diameter smaller than the mean free path of gas molecules can be easily formed in the core.

The core molded body can be fired by microwave heating by using an organic solvent that comprises at least a polar organic solvent. If microwave-heated, the core molded body can be heated quickly and uniformly from inside, and hence a core can be produced, in a short time, that exhibits a card-house structure in which talc cleavage products are intricately stacked.

Also, incorporating a combustion aid into the core starting material composition has the effect of increasing the calorific value of the core molded body and eliciting rapid heating up to the interior of the core molded body, whereby the entire core molded body can be heated uniformly in a short time.

DETAILED DESCRIPTION

In the present invention, there is produced a vacuum insulation material as a result of a step of producing a core and a step of vacuum-packaging the core using a gas-barrier packaging material.

The production process of the core will be explained first.

In the present invention, a core is produced by molding a core starting material composition, containing a talc-based clay mineral, a potassium compound and an organic solvent, into a predetermined shape to yield a core molded body, and firing the core molded body at a temperature that is lower than the melting point of the talc-based clay mineral.

Figure 1:
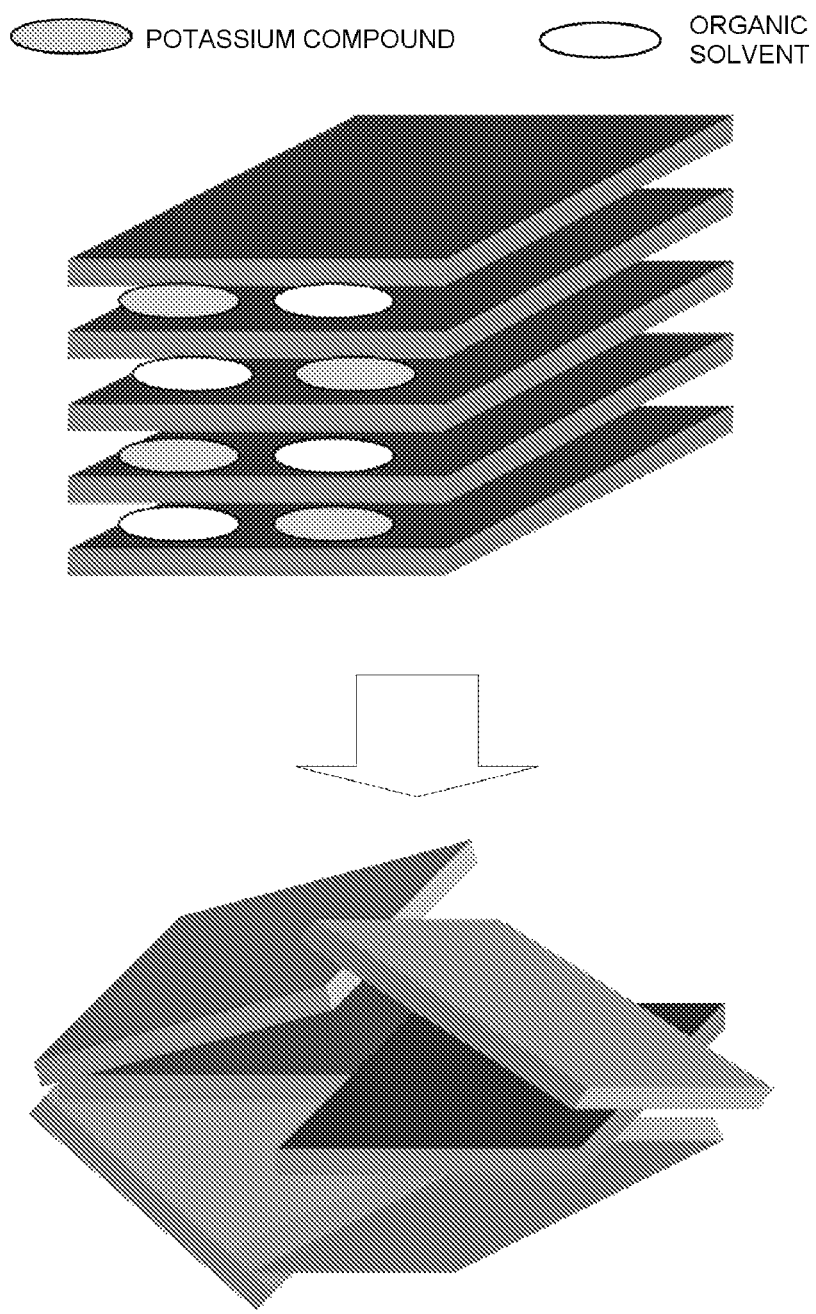
FIG. 1 is a form model diagram of a core of the present invention.

The organic solvent and the potassium compound become intercalated between layers of the talc-based clay mineral, as illustrated in FIG. 1(a), as a result of mixing the talc-based clay mineral, the potassium compound and the organic solvent, and the talc-based clay mineral swells up. Through firing of the core starting material composition after molding thereof into a core molded body of predetermined shape, a blowing gas such as carbon dioxide, hydrogen carbonate gas or the like is generated by the potassium compound that is intercalated between layers of the talc-based clay mineral, and, as a result, the talc-based clay mineral undergoes interlayer expansion and cleavage into layers. The organic solvent becomes intercalated between layers of the talc-based clay mineral, and is dispersed substantially homogeneously in the core molded body. Therefore, the calorific value of the core molded body increases by virtue of the organic solvent, and the core molded body can be sufficiently heated, up to the interior thereof. A card-house structure, as illustrated in FIG. 1(b), is formed through stacking of the talc cleavage products. The stacked talc cleavage products undergo partial bonding to each other through firing, and the card-house structure becomes fixed thereby. By-products such as potassium carbonate, potassium oxide or the like are generated as a result of the thermal decomposition of the potassium compound during firing of the core starting material composition, but these byproducts become mixed with the talc cleavage products, or become partially bonded to the talc cleavage products.

In the present invention, "talc cleavage products" encompasses not only the result of complete delamination, layer by layer, of the layers of the talc-based clay mineral, but also instances where a plurality of layers of the talc-based clay mineral delaminate together as one.

Preferably, the talc-based clay mineral that is used in the core starting material composition is a silicate clay mineral in which there are stacked a plurality of charge-neutral three-layer structural layers (2:1 layers), in each of which a magnesium octahedron layer or aluminum octahedron layer is sandwiched between two silica tetrahedron layers. The structure having a unit layer in the form of a three-layer structural layer in which a magnesium octahedron layer is sandwiched between two silica tetrahedron layers corresponds to talc (chemical formula $Mg_3Si_4O_{10}(OH)_2$). The structure having a unit layer in the form of a three-layer structural layer in which an aluminum octahedron layer is sandwiched between two silica tetrahedron layers corresponds to pyrophyllite (chemical formula $Al_2Si_4O_{10}(OH)_2$). The melting point of the talc-based clay mineral is of about 930 to 1000° C., depending on purity and other factors. A natural talc-based clay mineral contains impurities in the form of elements such as Fe, Al, Na, F and the like.

The average particle size of the talc-based clay mineral used in the core starting material composition ranges preferably from 1 to 25 μm, more preferably from 1 to 20 μm. When the average particle size of the talc-based clay mineral lies within the above ranges, porosity is high, and a core can be readily obtained that has a pore diameter smaller than the mean free path of gas molecules. The average particle size of the talc-based clay mineral in the present invention denotes a value measured by laser diffraction.

Preferably, the talc-based clay mineral is mixed to yield a content of 10 to 50 mass %, more preferably 20 to 40 mass %, and particularly preferably 25 to 35 mass %, in the core starting material composition. If the content of the talc-based clay mineral is smaller than 10 mass %, there increases the content of the potassium compound in the core starting material composition, and hence a significant amount of blowing gas is generated upon firing of the core starting material composition, and the pore diameter of the obtained core tends to be large. If the content of the talc-based clay mineral exceeds 50 mass %, the content of the potassium compound decreases, and hence the amount of blowing gas that is generated upon firing of the core starting material composition decreases, the talc-based clay mineral may fail to cleave sufficiently, and the porosity of the obtained core tends to be low.

Preferably, the potassium compound that is used in the core starting material composition is one or more types selected from potassium carbonate and potassium hydrogen carbonate. The average particle size of the potassium compound ranges preferably from 1 to 100 μm, more preferably from 1 to 50 μm. When the average particle size of the potassium compound lies within the above ranges, the miscibility of the potassium compound with the talc-based clay mineral is good, and the talc-based clay mineral cleaves readily. In the present invention, the average particle size of the potassium compound denotes the average value of measurements of the short sides of 100 particles arbitrarily selected in a SEM micrograph of an arbitrary portion of the potassium compound.

Preferably, the potassium compound is mixed to yield a content of 50 to 90 mass %, more preferably 60 to 80 mass %, and particularly preferably 65 to 75 mass %, in the core starting material composition. If the content of the potassium compound is smaller than 50 mass %, the amount of blowing gas generated upon firing of the core starting material composition is small, and hence the talc-based clay mineral may fail to cleave sufficiently, and the porosity of the obtained core tends to be low. The amount of produced potassium carbonate and so forth decreases as well, and hence the effectiveness of removal of outgas, moisture or the like is impaired. If the content of the potassium compound exceeds 90 mass %, a significant amount of blowing gas is generated upon firing of the core starting material composition, and the pore diameter of the obtained core tends to be large.

Both polar organic solvents and non-polar organic solvents can be preferably utilized as the organic solvent that is used in the core starting material composition. If a polar organic solvent is used, the core molded body can be fired by microwave heating. If microwave-heated, the core molded body can be heated quickly and uniformly from inside, and hence a core can be produced, in a short time, that exhibits a card-house structure in which talc cleavage products are intricately stacked.

Examples of polar organic solvents include, for instance, methanol, ethanol, propanol, glycol, dimethyl ether, acetone, glycerin, ethylene glycol, butyl alcohol, dimethylformamide, dichloromethane, dichloroethane, tetrahydrofuran and the like.

Examples of non-polar organic solvents include, for instance, hexane, heptane, octane, nonane, decane, undecane, dodecane, tridecane, tetradecane, pentadecane, hexadecane, heptadecane, octadecane and nonadecane, which are linear alkanes, and benzene, toluene, cyclopentane, cyclohexane and cycloheptane, which are alicyclic organic compounds; other examples include an aqueous solution of sodium chloride and an aqueous solution of potassium chloride.

Glycol or glycerin is preferably used as the organic solvent in terms of miscibility with the talc-based clay mineral, calorific value and so forth.

The organic solvent is preferably mixed to a content, in the core starting material composition, of 5 to 20 parts by mass, more preferably 7 to 20 parts by mass, and particularly preferably 10 to 20 parts by mass, with respect to a total of 100 parts by mass of the talc-based clay mineral and the potassium compound. By virtue of containing the organic solvent, the core starting material composition affords a greater calorific value in the core molded body, and the latter can be heated uniformly, up to the interior thereof, during firing. Moreover, the moldability of the core starting material composition is enhanced, such that the composition can be readily molded to a desired shape. Moldability is impaired if the content of organic solvent is excessive. Also, the calorific value of the core molded body becomes too high, and the talc-based clay mineral becomes likelier to melt and vitrify during firing. Accordingly, the upper limit is preferably 20 parts by mass, and the lower limit is preferably 5 parts by mass, with moldability in mind.

In a case where water is used instead of the organic solvent in the core starting material composition, the core molded body may fail to be sufficiently heated, up to the interior thereof, firing unevenness may occur, and inter-layer cleavage in the talc-based clay mineral inside the core molded body may be insufficient.

In the present embodiment, a combustion aid may be included in the core starting material composition, in addition to the abovementioned starting materials. Incorporating the combustion aid has the effect of increasing the calorific value of the core molded body and eliciting rapid heating up to the interior of the core molded body, whereby the entire core molded body can be heated uniformly in a short time.

Examples of the combustion aid include, for instance, fatty acids such as lauric acid, myristic acid, pentadecyl acid, palmitic acid, palmitoleic acid, margaric acid, stearic acid, oleic acid, vaccenic acid, linoleic acid, arachidic acid or the like, and esters of the foregoing fatty acids with glycerin, as well as paraffin.

If a combustion aid is included in the composition, then the content thereof ranges preferably from 0.1 to 20 parts by mass, more preferably from 1 to 15 parts by mass, and particularly preferably from 1 to 10 parts by mass with respect to a total of 100 parts by mass of the talc-based clay mineral and the potassium compound. If the content of the combustion aid is excessive, the calorific value of the core molded body increases, and the talc-based clay mineral melts and vitrifies readily during firing. Accordingly, the upper limit is preferably 20 parts by mass. On the other hand, addition of the combustion aid elicits virtually no effect if the upper limit is smaller than 0.1 parts by mass.

The core starting material composition in the present invention may contain an organic blowing agent having an amide group and/or an azo group. For reasons not wholly clear, incorporating an organic blowing agent elicits the effect of facilitating cleavage in the talc-based clay mineral, facilitating formation of the card-house structure, and yielding a core having yet better thermal insulation properties.

Examples of the organic blowing agent include, for instance, azodicarbonamide or the like.

If the abovementioned organic blowing agent is included in the composition, then the content thereof ranges preferably from 1 to 50 parts by mass, more preferably from 5 to 20 parts by mass, with respect to a total of 100 parts by mass of the talc-based clay mineral and the potassium compound. On the other hand, addition of the organic blowing agent elicits virtually no effect if the content of the organic blowing agent is smaller than 1 part by mass. If the content exceeds 50 parts by mass, there is generated a significant amount of blowing gas during firing of the core starting material composition, and the pore diameter of the obtained core tends to be larger.

In the present invention, water, an inorganic blowing agent or an organic blowing agent other than the abovementioned one may be further added, as the case may require, to the core starting material composition, in amounts such that physical properties are not impaired thereby.

Next, a core molded body is produced through molding of the core starting material composition prepared as described above to a desired shape. The molding method of the core starting material composition is not particularly limited, and may be roll forming, press molding, extrusion molding or the like. Preferred among the foregoing is roll forming, on account of the low equipment and running costs involved, and the excellent productivity that this method affords. The orientation of the talc-based clay mineral is enhanced, and the card-house structure is formed more readily, through roll forming of the core starting material composition.

Next, the core molded body having been molded to a desired shape is fired by heating at a temperature that is lower than the melting point of the talc-based clay mineral, to thereby produce a core.

The firing method is not particularly limited, and may involve, for instance, infrared heating, microwave heating or the like. Infrared heating and microwave heating may be used concomitantly. If microwave-heated, the core molded body can be heated quickly and uniformly from inside, and hence a core can be produced, in a short time, that exhibits a card-house structure in which talc cleavage products are intricately stacked. If infrared heating and microwave heating are used concomitantly, the entire core molded body can be heated yet more uniformly, and hence firing unevenness is unlikelier to occur.

The principle of microwave heating involves arranging a product to be heated in a microwave electric field; thereupon, polar molecules that make up the product to be heated are acted upon by the force of radio waves (electric field) and vibrate strongly thereby in accordance with the frequency of the microwave, and the product to be heated becomes thus heated by the frictional heat that is generated as a result between the molecules. In order to be fired by microwave heating, accordingly, the core molded body must comprise polar molecules; hence, a polar organic solvent is used as the organic solvent. If no polar organic solvent is present, the core molded body cannot be fired by microwave heating, and hence firing by infrared heating is necessary in this case.

Examples of firing equipment by infrared heating include, for instance, electric furnaces, gas furnaces, induction furnaces and the like. Examples of firing equipment by microwave heating include, for instance, microwave heating devices and the like.

Preferably, the firing temperature is a temperature lower by 10 to 230° C. than the melting point of the talc-based clay mineral. Specifically, the firing temperature ranges preferably from 700° C. to less than 1000° C., and more preferably from 750° C. to less than 900° C. The card-house structure fails to be formed, and a dense sintered compact is obtained instead, if the core molded body is heated at a temperature higher than the melting point of the talc-based clay mineral.

By heating the core molded body at a temperature that is lower than the melting point of the talc-based clay mineral, the organic solvent and the potassium compound decompose thermally between the layers of the talc-based clay mineral, and a blowing gas such as carbon dioxide, hydrogen carbonate gas or the like is generated as a result. The layers of the talc-based clay mineral are pushed apart from each other by the blowing gas, and the talc-based clay mineral is cleaved into layers. Partial bonding is elicited, for instance by solid-phase reactions, at those portions at which talc cleavage products that are cleaved into layers are in contact with each other, and the card-house structure becomes thus fixed. The potassium compound can undergo substantially complete thermal decomposition, the blowing gas can be generated efficiently, and the talc-based clay mineral can be likewise cleaved with good efficiency, through heating of the core molded body at 700° C. or above. If the heating temperature of the core molded body is excessively low, the potassium compound does not readily undergo thermal decomposition, the generation amount of blowing gas decreases, and hence the talc-based clay mineral cleaves less readily. Also, part or the entirety of the potassium compound comprised in the core molded body undergoes thermal decomposition during firing, and decomposes into a blowing gas such as carbon dioxide, hydrogen carbonate gas or the like, and into potassium oxide and/or potassium carbonate. The blowing gas is discharged into the atmosphere, but potassium oxide and potassium carbonate remain in the porous fired body.

The firing time varies depending on the firing method. In firing by infrared heating, for instance, the firing time ranges preferably from 1 to 12 hours, more preferably from 1 to 8 hours. In firing by microwave heating, the firing time varies depending on the frequency of the microwaves that are irradiated, but ranges preferably from 0.08 to 4 hours, more preferably from 0.1 to 2 hours, in the case, for instance, of microwaves from 0.93 to 24.1 GHz.

In the present invention, preferably, the core molded body is dried before being fired. The drying method is not particularly limited, and may involve, for instance, hot-air drying, sun drying, vacuum drying, subcritical drying, supercritical drying or the like. Drying the core molded body allows preventing the occurrence of cracks and the like upon subsequent firing.

The core thus obtained is made up of a porous fired body in which a layered structure of the talc-based clay mineral is cleaved and at least part thereof is partially bonded. The porous fired body exhibits a card-house structure such that talc cleavage products are intricately stacked and the spacing between layers in the talc-based clay mineral is widened. High shape retention is achieved in that the stacked talc cleavage products become partially bonded as a result of solid-phase reactions or the like. Observation under an electronic microscope allows checking whether or not the card-house structure is formed in the porous fired body.

The bulk density of the core thus obtained, in a state before vacuum packaging, ranges preferably from 0.15 to 1.5 g/cm$^3$, more preferably from 0.15 to 1.3 g/cm$^3$, and particularly preferably from 0.15 to 1.0 g/cm$^3$. The porosity ranges preferably from 55 to 95%, more preferably from 65 to 95%, and particularly preferably from 75 to 95%.

The core thus obtained contains preferably 13 to 59 mass %, more preferably 20 to 40 mass %, of the talc-based clay mineral. The core contains preferably 41 to 87 mass %, more preferably 51 to 73 mass %, of the potassium compound. Examples of the potassium compound that remains after the above-described firing include, for instance, potassium oxide, potassium carbonate, potassium hydrogen carbonate or the like, preferably potassium carbonate. Potassium carbonate affords an excellent effect of adsorption and removal of moisture and outgas, such as hydrocarbons or the like, that is given off by packaging materials. Therefore, the degree of vacuum of the vacuum insulation material does not drop readily, even when the latter is exposed to high temperatures, and superior thermal insulation properties can be preserved over long periods of time.

An explanation follows next on a vacuum packaging process of the core.

The core obtained as described above is disposed in a gas-barrier packaging material, and the interior of the packaging material is depressurized, followed by sealing to complete vacuum packaging.

The packaging material is not particularly limited, so long as it has gas barrier properties. Examples of the packaging material include, for instance, a laminate material that is made up of a heat bonding layer, a gas barrier layer, and a protective layer. Examples of the heat bonding layer include, for instance, polyethylene films, polypropylene films, polyacrylonitrile films, polyethylene terephthalate films or the like. Examples of the gas barrier layer include, for instance, metal foils or metal deposition films made up of aluminum, iron, copper or nickel, or alloys of the foregoing. Examples of the protective layer include, for instance, nylon films.

Preferably, the interior of the packaging material is depressurized to 10 Pa or less, more preferably to 1 to 10 Pa. Sufficient thermal insulation properties cannot be achieved if the pressure inside the packaging material exceeds 10 Pa.

The bulk density of the core in the state after vacuum packaging ranges preferably from 0.16 to 1.7 g/cm$^3$, more preferably from 0.15 to 1.3 g/cm$^3$. If the bulk density is smaller than 0.16 g/cm$^3$, strength tends to be insufficient, while a bulk density in excess of 1.7 g/cm$^3$ is accompanied by rises in thermal conductivity. The bulk density of the core is a value measured by a constant volume expansion method.

The porosity of the core in a state after vacuum packaging ranges preferably from 49 to 86%, more preferably from 58 to 86%. Thermal conductivity rises if the porosity is smaller than 49%, while strength tends to be insufficient if the porosity exceeds 86%. The porosity of the core is a value measured by a constant-volume expansion method.

The vacuum insulation material thus obtained does not readily exhibit increases in thermal conductivity, even in high-temperature environments, and has excellent thermal insulation properties. Moisture and outgas undergo adsorptive removal by potassium carbonate or the like, and hence the degree of vacuum does not drop readily and excellent thermal insulation properties can be maintained over long periods of time. Thermal conductivity is preferably 0.015 W/mK or less, and ranges, more preferably, from 0.001 to 0.015 W/mK, particularly preferably from 0.001 to 0.010 W/mK, under conditions of average temperature of 20° C. and temperature difference 20° C., as measured according to JIS-A1412.

In the vacuum insulation material obtained in accordance with the production method of the present invention, preferably, the pore diameter of the core, in a vacuum-packaged state, is smaller than the mean free path of gas molecules. The thermal conductivity of the gas can be thus further lowered by virtue of the fact that the pore diameter of the core is smaller than the mean free path of the gas molecules. Herein, the mean free path of gas molecules denotes the average value of the flight distance of gas molecules from a given collision until a subsequent collision. For instance, the mean free path of air at atmospheric pressure is of about 68 nm, and the mean free path of air at about 1 Pa is about 100 μm. The pore diameter of the core can be measured by observation under a scanning electron microscope (SEM).

The vacuum insulation material obtained in accordance with the production method of the present invention can be preferably used in appliances such as freezers, refrigerators, cooler/warmer boxes and vending machines, in the production of residential wall materials and in other various fields.

EXAMPLES

Example 1

Figure 2:
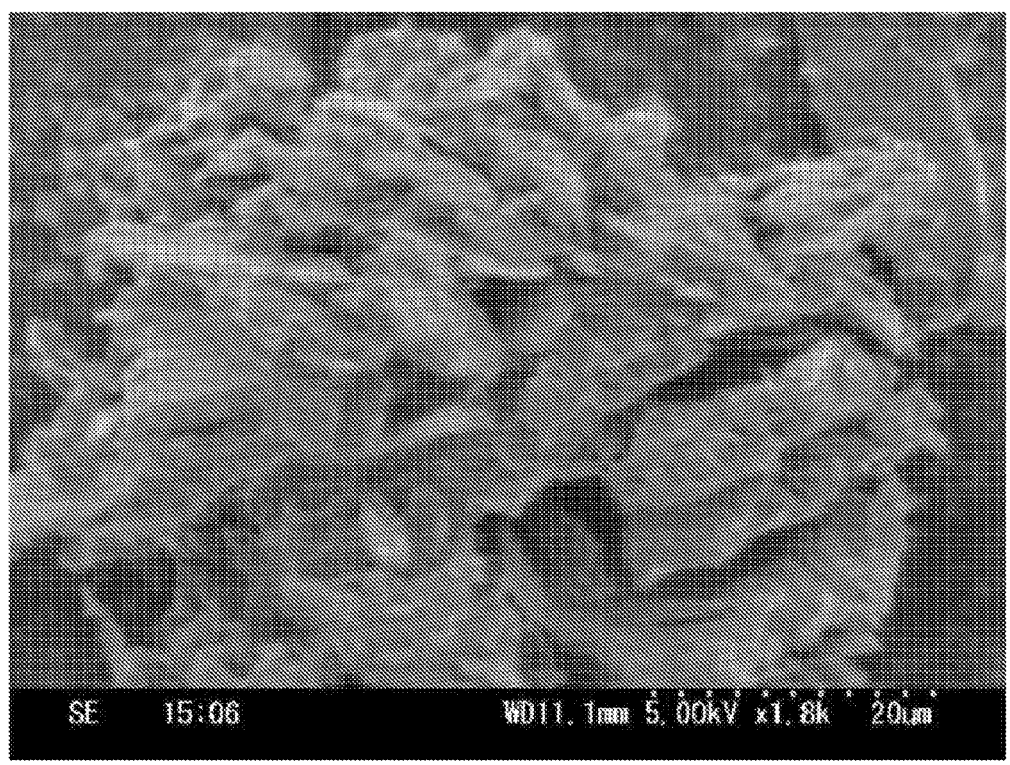
FIG. 2 is an electron micrograph of a core in Example 1.

A core starting material composition was prepared by kneading 400 g of talc (average particle size 14 μm, melting point 960° C.), 600 g of potassium hydrogen carbonate (average particle size 50 μm) and 150 g of glycerin. The core starting material composition was roll-formed to a sheet-like shape, 5 mm thick, to yield a green sheet (core molded body). The green sheet was set in an electric furnace and was fired for 6 hours at 900° C. by infrared heating. The fired green sheet (fired body) was placed in a vacuum drier, and was vacuum-dried at 150° C. for 2 hours, followed by cooling down to room temperature while vacuum was maintained inside the vacuum drier, to thereby produce a core. The core had a bulk density of 0.23 g/cm$^3$ and a porosity of 90%. FIG. 2 illustrates an electron micrograph of the obtained core.

Next, the obtained core was placed into a three-side sealed bag of a laminate film comprising polyamide, aluminum foil and polyethylene, and the whole was vacuum-sealed through depressurization to 10 Pa or less in a vacuum chamber, to produce a vacuum insulation material.

The thermal conductivity of the obtained vacuum insulation material was measured using a thermal conductivity meter (HC-074, by EKO Instruments), according to JIS-A1412, under conditions of average temperature ranging from 20 to 60° C. and temperature difference of 20° C. The thermal conductivity at an average temperature of 20° C. was 0.003 W/mK.

Example 2

A core was produced in the same way as in Example 1, but herein the core molded body of Example 1 was set in a microwave heating device, and the core molded body was fired through heating at 900° C., by being irradiated with 2.45 GHz microwaves for 60 minutes. A vacuum insulation material was produced in the same way as in Example 1 using the obtained core, and thermal conductivity was measured in the same way as in Example 1.

The core had a bulk density of 0.23 g/cm$^3$ and a porosity of 90%. The thermal conductivity of the obtained vacuum insulation material, at an average temperature of 20° C., was 0.003 W/mK.

Example 3

A core was produced in the same way as in Example 1, but herein the core molded body of Example 1 was set in a microwave heating device, and was heated at 900° C. by being irradiated with 2.45 GHz microwaves for 20 minutes, after which the core molded body was set in an electric furnace and was fired for 1 hour at 900° C. through infrared heating. A vacuum insulation material was produced in the same way as in Example 1 using the obtained core, and thermal conductivity was measured in the same way as in Example 1.

The core had a bulk density of 0.23 g/cm$^3$ and a porosity of 90%. The thermal conductivity of the obtained vacuum insulation material, at an average temperature of 20° C., was 0.003 W/mK.

Example 4

A core starting material composition was prepared by kneading 400 g of talc (average particle size 14 μm, melting point 960° C.), 600 g of potassium hydrogen carbonate (average particle size 50 μm), 150 g of glycerin, and 80 g of stearic acid.

The core starting material composition was roll-formed to a sheet-like shape, 5 mm thick, to yield a green sheet (core molded body). The green sheet was set in an electric furnace and was fired for 5 hours at 900° C. by infrared heating. The fired green sheet (fired body) was placed in a vacuum drier, and was vacuum-dried at 150° C. for 2 hours, followed by cooling down to room temperature while vacuum was maintained inside the vacuum drier, to thereby produce a core. The core had a bulk density of 0.22 g/cm$^3$ and a porosity of 91%.

A vacuum insulation material was produced in the same way as in Example 1 using the obtained core, and thermal conductivity was measured in the same way as in Example 1. The thermal conductivity of the vacuum insulation material, at an average temperature of 20° C., was 0.003 W/mK.

Comparative Example 1

Figure 3:
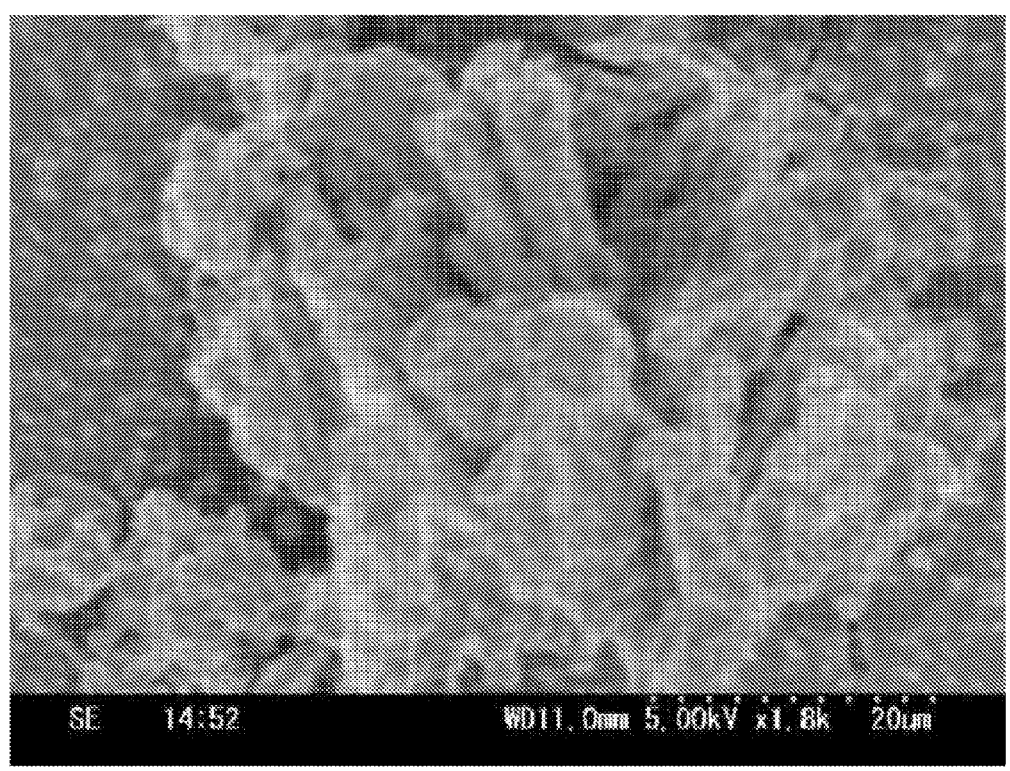
FIG. 3 is an electron micrograph of a core in Comparative example 1.

A core starting material composition was prepared by kneading 400 g of talc (average particle size 14 μm, melting point 960° C.), 600 g of potassium hydrogen carbonate (average particle size 50 μm) and 200 g of water. The core starting material composition was roll-formed to a sheet-like shape, 5 mm thick, to yield a green sheet (core molded body). The green sheet was set in an electric furnace and was fired for 6 hours at 900° C. by infrared heating. The fired green sheet (fired body) was placed in a vacuum drier, and was vacuum-dried at 150° C. for 2 hours, followed by cooling down to room temperature while vacuum was maintained inside the vacuum drier, to thereby produce a core. The core had a bulk density of 0.25 g/cm$^3$ and a porosity of 83%. FIG. 3 illustrates an electron micrograph of the obtained core.

A vacuum insulation material was produced in the same way as in Example 1 using the obtained core, and thermal conductivity was measured in the same way as in Example 1. The thermal conductivity of the vacuum insulation material, at an average temperature of 20° C., was 0.004 W/mK.

Comparative Example 2

A core was produced in the same way as in Comparative example 1, but herein the core molded body of Comparative example 1 was set in a microwave heating device, and the core molded body was heated at 900° C., by being irradiated with 2.45 GHz microwaves for 20 minutes. A vacuum insulation material was produced in the same way as in Comparative example 1 using the obtained core, and thermal conductivity was measured in the same way as in Comparative example 1. The core had a bulk density of 0.24 g/cm$^3$ and a porosity of 87%. The thermal conductivity of the obtained vacuum insulation material, at an average temperature of 20° C., was 0.004 W/mK.

Comparative Example 3

A core was produced in the same way as in Comparative example 1, but herein the core molded body of Comparative example 1 was set in a microwave heating device, and was heated at 900° C. by being irradiated with 2.45 GHz microwaves for 20 minutes, after which the core molded body was set in an electric furnace and was fired for 1 hour at 900° C. through infrared heating. A vacuum insulation material was produced in the same way as in Comparative example 1 using the obtained core, and thermal conductivity was measured in the same way as in Comparative example 1. The core had a bulk density of 0.24 g/cm$^3$ and a porosity of 87%. The thermal conductivity of the obtained vacuum insulation material, at an average temperature of 20° C., was 0.004 W/mK.

The invention claimed is:

1. A method for producing a vacuum insulation material, comprising the steps of:
   producing a core by molding a core starting material composition, containing a talc-based clay mineral, a potassium compound and an organic solvent, into a predetermined shape to yield a core molded body, and firing the core molded body at a temperature that is lower than a melting point of the talc-based clay mineral; and
   vacuum-packaging the core with a gas-barrier packaging material.

2. The method for producing a vacuum insulation material according to claim 1,
   wherein the core molded body is fired by infrared heating.

3. The method for producing a vacuum insulation material according to claim 1,
   wherein the organic solvent contains at least a polar organic solvent, and the core molded body is fired by microwave heating, or by microwave heating and infrared heating concomitantly.

4. The method for producing a vacuum insulation material according to claim 1,
   wherein a talc-based clay mineral having an average particle size ranging from 1 to 25 μm is used as the talc-based clay mineral.

5. The method for producing a vacuum insulation material according to claim 1,
   wherein the potassium compound includes at least one of potassium carbonate or potassium hydrogen.

6. The method for producing a vacuum insulation material according to claim 1,
   wherein the core starting material composition contains, in a solids fraction, 10 to 50 mass % of the talc-based clay mineral and 50 to 90 mass % of the potassium compound, and contains 5 to 20 parts by mass of the organic solvent with respect to a total of 100 parts by mass of the talc-based clay mineral and the potassium compound.

7. The method for producing a vacuum insulation material according to claim 1,
   wherein the core starting material composition further contains a combustion aid, and a content of the combustion aid ranges from 0.1 to 20 parts by mass with respect to a total of 100 parts by mass of the talc-based clay mineral and the potassium compound.

8. The method for producing a vacuum insulation material according to claim 7, wherein the combustion aid includes at least one of a fatty acid, a fatty acid ester or a paraffin.

9. The method for producing a vacuum insulation material according to claim 1,
wherein the core starting material composition is roll-formed to yield the core molded body, followed by the firing.

10. The method for producing a vacuum insulation material according to claim 1,
wherein the core molded body is fired through heating at a temperature ranging from 700° C. to less than 1000° C.

11. The method for producing a vacuum insulation material according to claim 1,
wherein a bulk density of the core ranges from 0.15 to 1.5 g/cm$^3$ in a state before vacuum packaging, and from 0.16 to 1.7 g/cm$^3$ in a state after vacuum packaging.

12. The method for producing a vacuum insulation material according to claim 1,
wherein a porosity of the core ranges from 55 to 95% in a state before vacuum packaging, and from 49 to 86% in a state after vacuum packaging.

13. A method, comprising:
forming a composition including a talc-based clay mineral, a potassium compound and an organic solvent;
forming the composition into a predetermined shape;
heating the composition of the predetermined shape at a temperature that is lower than a melting point of the talc-based clay mineral to produce an insulation material; and
vacuum-packaging the insulation material.

14. The method of claim 13, wherein the heating the composition of the predetermined shape includes at least one of using microwave heating or infrared heating.

15. The method of claim 13, further comprising including a combustion aid in the composition.

* * * * *